March 11, 1924.
O. BODEEN
1,486,627
CHAIN FASTENER
Filed Sept. 15, 1923
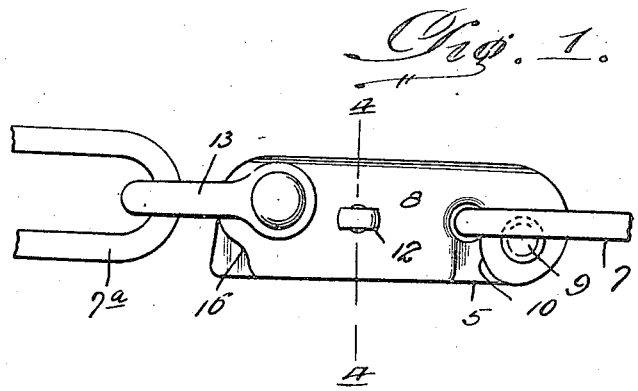
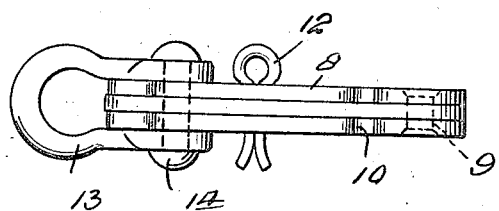
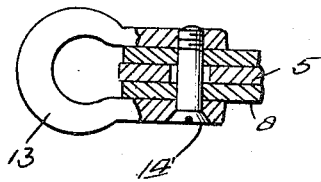
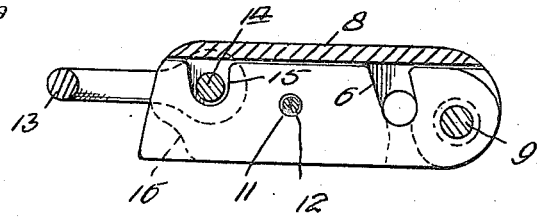
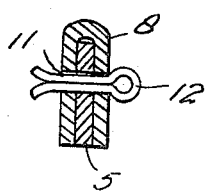
O. Bodeen,
Inventor
Witnesses:
Attorney Patented Mar. 11, 1924.

1,486,627

UNITED STATES PATENT OFFICE.

OLOF BODEEN, OF PORT WING, WISCONSIN.

CHAIN FASTENER.

Application filed September 15, 1923. Serial No. 662,833.

*To all whom it may concern:*

Be it known that I, OLOF BODEEN, citizen of the United States, residing at Port Wing, in the County of Bayfield and State of Wisconsin, have invented certain new and useful Improvements in Chain Fasteners, of which the following is a specification.

The objects of my invention are to provide a very simple but efficient fastener for skid chains for automobile tires which may be locked by means of a cotter pin, and to provide for extreme durability and ease of operation in such a device. I attain the objects of my invention by the illustration in the accompanying drawings, in which:

Figure 1 is a side elevation of the invention applied to a tire chain.

Figure 2 is a bottom plan view of the device.

Figure 3 is a detailed view, partly in side elevation and partly in longitudinal section, of the device in locked position.

Figure 4 is a section on line 4—4 of Figure 1, and

Figure 5 is a fragmentary sectional view, illustrating a modification of the invention.

Like numerals designate like parts in each of the several views.

Referring to the accompanying drawing, I provide a fastener or lock plate 5, having an oblique transversely extending slot 6 adapted to receive the link of the skid chain. I further provide a lock plate cover 8 of U-shape in cross-section and pivoted to plate 5 by pivot 9 at one end of the device, the slot 6 being adjacent to said pivot.

When the outer plate or cover 8 is closed over the inner plate 5, the slots 10, of said cover, which correspond in position to slot 6 of plate 5, coact with said slot 6 so as to leave an approximately round opening through both plates, the slots being in overlapping relation.

The cover 8 and plate 5 are provided with intermediate openings as at 11 adapted to aline with each other when the device is closed, and a fastening means, such as the cotter pin 12, is adapted to pass through said aligned openings for fastening the plate 5 within the cover 8, and thus holding the link 7 engaged in the opening left by the slots 6 and 10 as shown in Figure 1.

The other end of the fastener is suitably attached, either detachably or permanently, to the other end link 7ª of the chain. In either case, the connection is preferably made by engaging the link 7ª with a bail or yoke 13 that is pivoted to the adjacent end of the cover 8 as indicated at 14 in Figures 1 to 3 inclusive and at 14′ in Figure 5. The pivot 14 consists of a headed rivet passing through the sides of the cover 8 adjacent the back wall of the latter and through the ends of the bail 12, while the pivot 14′ embodies a bolt positioned in a similar manner, but with the head thereof countersunk in one end of the bail and threaded into the other end of the latter.

As shown, the opening for the link 7 is arranged intermediate or midway between the front and back edges of the device, and the pivot 9 is positioned adjacent the front edge thereof, so that the tension on the chain will tend to keep the device closed and thereby relieve the cotter pin 12 of considerable strain.

The inner edge of the plate 5 is provided with a notch as at 15, near the free end of said plate, to provide clearance for the pivot 14 or 14′. In order to facilitate opening of the device, the corners of the sides of cover 8 adjacent the free end of plate 5 are cut away as at 16 to expose a substantial portion of the free end of plate 5 to be grasped by pliers or the like whereby said plate may be readily swung open sufficiently to release the link 7 upon removal of the cotter pin 12.

The operation of the device will be apparent from the accompanying drawing in connection with the foregoing description of its construction.

What I claim as new is:

A chain fastener comprising a plate member having parallel spaced side portions provided at their points between their ends with slots leading in from the edges thereof, the inner ends of the slots being disposed to one side of the median longitudinal dimensions of the said side portions, a shackle pivotally connected with the side portions of the plate member at a point between the said slots and the ends of the side portions of the plate member and between the median longitudinal dimension of the side portions of the plate member and the intermediate portion of the plate member, a locking plate pivotally conected with the side portions of the first mentioned plate member for swinging movement between the side portions thereof and having a slot leading in from one edge and adapted to register with the slots in the side portions of the said plate member, the inner end of the slot in the said locking plate when the said locking plate is in a closed position with relation to the said plate member being disposed approximately in alinement with the median longitudinal dimensions of the side portions of the first mentioned plate member, the slots of the side portions of the plate member and the locking plate having arcuate inner end walls adapted to receive between them a link of the chain and a pin passing transversely through the side portions of the plate member and the locking plate at a point between the slots and the shackle.

In testimony whereof I affix my signature.

OLOF BODEEN.